(12) United States Patent
Orr et al.

(10) Patent No.: US 8,300,429 B2
(45) Date of Patent: Oct. 30, 2012

(54) CASCADED PFC AND RESONANT MODE POWER CONVERTERS

(75) Inventors: Raymond K. Orr, Kanata (CA); Roger Colbeck, Ottawa (CA); Hartley Horwitz, Ottawa (CA); Philip Craine, Saratoga, CA (US); Mircea C. Boros, Richmond Hill (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 12/982,582

(22) Filed: Dec. 30, 2010

(65) Prior Publication Data

US 2011/0095734 A1    Apr. 28, 2011

Related U.S. Application Data

(63) Continuation of application No. 12/016,945, filed on Jan. 18, 2008, now Pat. No. 7,885,085.

(60) Provisional application No. 60/881,480, filed on Jan. 22, 2007.

(51) Int. Cl.
    *H02M 3/335* (2006.01)
(52) U.S. Cl. .................................................. 363/21.02
(58) Field of Classification Search .................... 363/16, 363/17, 21.02, 21.03, 97, 98, 131, 132
    See application file for complete search history.

(56) References Cited

U.S. PATENT DOCUMENTS

| | | | |
|---|---|---|---|
| 5,450,305 A | 9/1995 | Boys et al. | |
| 5,500,792 A | 3/1996 | Jeon et al. | |
| 5,510,974 A | 4/1996 | Gu et al. | |
| 5,565,761 A | 10/1996 | Hwang | |
| 5,598,326 A | 1/1997 | Liu et al. | |
| 5,629,841 A | 5/1997 | Attwood | |
| 5,642,065 A | 6/1997 | Choi et al. | |
| 5,757,166 A | 5/1998 | Sodhi | |
| 5,798,635 A | 8/1998 | Hwang et al. | |
| 6,181,079 B1 * | 1/2001 | Chang et al. | 315/247 |
| 6,215,288 B1 | 4/2001 | Ramsey et al. | |
| 6,249,876 B1 | 6/2001 | Balakrishnan et al. | |
| 6,272,025 B1 | 8/2001 | Riggio et al. | |
| 6,307,361 B1 | 10/2001 | Yaakov et al. | |

(Continued)

OTHER PUBLICATIONS

Fairchild Semiconductor, "Application Note 42047; Power Factor Correction (PFC) Basics," Rev.0.9.0, Aug. 19, 2004, 11 pgs.

(Continued)

*Primary Examiner* — Matthew Nguyen
(74) *Attorney, Agent, or Firm* — Blakely Sokoloff Taylor & Zafman LLP

(57) ABSTRACT

A power supply includes a PFC (power factor correction) converter that has an input and an output. The PFC converter input is coupled to an input of the power supply. The power supply also includes a resonant mode converter that has an input and an output. The resonant mode converter input is coupled to the PFC converter output and the resonant mode output is coupled to an output of the power supply. A control unit is also included in the power supply and is coupled to receive a feedback signal that is representative of the output of the power supply. The control unit is coupled to provide control signals coupled to control switches of the resonant mode converter at a controlled switching frequency to control the output of the power supply. The control unit is further coupled to provide a PFC control signal coupled to control a switch of the PFC converter at a switching frequency that is harmonically related to the controlled switching frequency.

8 Claims, 5 Drawing Sheets

U.S. PATENT DOCUMENTS

| | | |
|---|---|---|
| 6,437,994 B1 | 8/2002 | Blom et al. |
| 6,462,966 B1 | 10/2002 | Leung et al. |
| 6,469,917 B1 | 10/2002 | Ben-Yaakov |
| 6,545,882 B2 | 4/2003 | Yang |
| 6,728,121 B2 | 4/2004 | Ben-Yaakov et al. |
| 6,839,247 B1 | 1/2005 | Yang et al. |
| 6,903,536 B2 | 6/2005 | Yang |
| 6,969,978 B2 | 11/2005 | Dening |
| 7,042,743 B2 | 5/2006 | Pidutti et al. |
| 7,184,280 B2 | 2/2007 | Sun et al. |
| 7,436,685 B2 | 10/2008 | Li et al. |
| 7,440,297 B2 | 10/2008 | Adragna et al. |
| 7,821,237 B2 | 10/2010 | Melanson |
| 7,821,801 B2 * | 10/2010 | Janson et al. ............ 363/126 |
| 7,848,117 B2 | 12/2010 | Reinberger et al. |
| 7,885,085 B2 | 2/2011 | Orr et al. |
| 7,911,812 B2 | 3/2011 | Colbeck et al. |
| 7,916,506 B2 | 3/2011 | Zhang et al. |
| 8,014,172 B2 | 9/2011 | Reinberger et al. |
| 8,031,489 B2 | 10/2011 | Wang et al. |
| 8,036,000 B2 | 10/2011 | Ying et al. |
| 8,085,563 B2 | 12/2011 | Gaboury et al. |
| 2003/0223255 A1 | 12/2003 | Ben-Yaakov et al. |
| 2007/0063684 A1 | 3/2007 | Adragna et al. |
| 2007/0242487 A1 | 10/2007 | Orr |
| 2008/0197817 A1 | 8/2008 | Colbeck et al. |
| 2008/0198638 A1 | 8/2008 | Reinberger et al. |
| 2009/0091957 A1 | 4/2009 | Orr et al. |
| 2009/0316454 A1 | 12/2009 | Colbeck et al. |
| 2011/0044074 A1 | 2/2011 | Reinberger et al. |
| 2011/0134670 A1 | 6/2011 | Colbeck et al. |
| 2012/0057372 A1 | 3/2012 | Reinberger et al. |
| 2012/0091982 A1 | 4/2012 | Colbeck et al. |

OTHER PUBLICATIONS

Fairchild Semiconductor, "FAN4803: 8-Pin PFC and PWM Controller Combo," Rev. 1.2.3, Nov. 2, 2004, p. 1.

ON Semiconductor, "Overview of Power Factor Correction Approaches," Power Factor Correction Handbook, Chapter 1, HBD853/D, Rev. 2, Aug. 2004, pp. 5-17.

Ben-Yaakov et al., "The Dynamics of a PWM Boost Converter with Resistive Input," IEEE Transactions on Industrial Electronics, vol. 46, No. 3, Jun. 1999, pp. 613-619.

Adragna, "AN1792 Application Note; Design of Fixed-Off-Time-Controlled PFC Pre-Regulators with the L6562," STMicroelectronics, Nov. 2003, pp. 1-30.

Yang, "LLC Resonant Converter," Chapter 4, *Topology Investigation for Front End DC/DC Power Conversion for Distributed Power System*, (dissertation submitted to the Faculty of Virginia Polytechnic Institute and State University, Sep. 12, 2003.

STMicroelectronics, "AN2321 Application Note; Reference Design: High Performance, L6599-based HB-LLC Adapter with PFC for Laptop Computers," Aug. 2006, pp. 1-29.

STMicroelectronics, "AN2393 Application Note; Reference Design: Wide Range 200W L6599-based HB-LLC Resonant Converter for LCD TV & Flat Panels," Sep. 2006, pp. 1-37.

STMicroelectronics, "L6563 L6563A; Advanced Transition-Mode PFC Controller," Nov. 2006, pp. 1-37.

STMicroelectronics, "L6599; High-Voltage Resonant Controller," Jul. 2006, pp. 1-36.

PCT/CA2008/000108—PCT International Search Report and Written Opinion, dated Apr. 15, 2008.

PCT/CA2008/000109—PCT International Search Report and Written Opinion, dated May 7, 2008.

PCT/CA2008/000111—PCT International Search Report and Written Opinion, dated May 1, 2008.

PCT/CA2008/000108—International Preliminary Report on Patentability and Written Opinion, dated Jul. 28, 2009.

PCT/CA2008/000109—International Preliminary Report on Patentability and Written Opinion, dated Jul. 28, 2009.

PCT/CA2008/000111—International Preliminary Report on Patentability and Written Opinion, dated Jul. 28, 2009.

CN 200880002882.8—First Chinese Office Action issued Sep. 26, 2011 (9 pages).

EP 09 150 478.7—European Search Report dated Apr. 28, 2009 (3 pages).

EP 09 150 478.7—European Office Action dated Aug. 26, 2009 (4 pages).

CN 200880002853.1—First Chinese Office Action issued Aug. 5, 2011 (8 pages).

"NCP1395A/B: High Performance Resonant Mode Controller," ON Semiconductor®, Rev. 1, Mar. 2006 (27 pages).

CN 200880002863.5—Chinese First Office Action with English Translation, issued Aug. 1, 2011 (16 pages).

CN 200880002863.5—Chinese Second Office Action with English Translation, issued Mar. 28, 2012 (18 pages).

* cited by examiner

CASCADED PFC AND RESONANT MODE POWER CONVERTERS

This application is a continuation of U.S. patent application Ser. No. 12/016,945, filed Jan. 18, 2008, now pending, which is a continuation and claims the benefit of U.S. Provisional Application No. 60/881,480 filed Jan. 22, 2007, now expired. U.S. patent application Ser. No. 12/016,945 and U.S. Provisional Application No. 60/881,480 are hereby incorporated herein by reference.

REFERENCE TO RELATED APPLICATIONS

Reference is directed to the following copending United States Patent Applications filed simultaneously herewith and claiming separate inventions, the entire contents and disclosure of each of which is hereby incorporated herein by reference:

"Control Arrangement For A PFC Power Converter", R. Colbeck et al., (PP046, 79115-65);

"Control Arrangement For A Resonant Mode Power Converter", Reinberger et al., (PP049, 79115-66).

This invention relates to cascaded PFC (Power Factor Correction) and resonant mode power converters.

BACKGROUND

It is known to provide a cascade of a boost converter for PFC followed by a PWM (pulse width modulation) buck converter for producing a lower voltage than the typically high output voltage of the PFC converter, and to operate these in a synchronized manner using a single clock reference. Such cascaded converters are described for example in Hwang U.S. Pat. No. 5,565,761, issued Oct. 15, 1996 and entitled "Synchronous Switching Cascade Connected Off-Line PFC-PWM Combination Power Converter Controller", and Hwang et al. U.S. Pat. No. 5,798,635, issued Aug. 25, 1998 and entitled "One Pin Error Amplifier And Switched Soft-Start For An Eight Pin PFC-PWM Combination Integrated Circuit Converter Controller".

Another arrangement comprising cascaded PFC and PWM power converters is known from Fairchild Semiconductor Application Note 42047 entitled "Power Factor Correction (PFC) Basics", Rev. 0.9.0, Aug. 19, 2004. Various PFC arrangements and their control are known for example from Chapter 1, entitled "Overview of Power Factor Correction Approaches", of "Power Factor Correction (PFC) Handbook", ON Semiconductor document HBD853/D, Rev. 2, August 2004.

In the Fairchild and ON Semiconductor documents referred to above, a PFC control unit is supplied with signals representing the input voltage, input current, and output voltage of the PFC converter and produces a PWM control signal using average current mode control to provide the PFC converter with a substantially resistive input.

In "The Dynamics of a PWM Boost Converter with Resistive Input" by S. Ben-Yaakov et al., IEEE Transactions on Industrial Electronics, Vol. 46, No. 3, June 1999, pp. 613-619 there is described an indirect PFC converter control scheme in which output voltage and input current, but not input voltage, of a boost converter operating in CCM are sensed to control the off-time duty cycle Doff of the converter to provide an equivalent resistive input, i.e. a power factor of 1. In this control scheme, operating in accordance with an equation Vin(av)=Doff·Vo(av) where Vin(av) is the average input voltage and Vo(av) is the average output voltage, an output voltage error is multiplied by average input current to produce a voltage that is modulated by a PWM modulator to produce Doff. This indirect control method has advantages such as being less susceptible to switching noise which is normally present on the input rectified line voltage, and not needing to monitor this voltage directly.

For relatively high converter powers, for example of about 200 W or more, it is desirable to operate the PFC converter in continuous current mode (CCM), in which a primary switch of the PFC converter is turned on before an inductor current has fallen to zero, to provide advantages such as relatively smaller inductor current swings and peak current. A PFC power converter operated in CCM usually has a fixed switching frequency. The PFC-PWM cascaded converters referred to above use an oscillator that determines the switching frequency for both converters.

Ta-yung Yang U.S. Pat. No. 6,903,536, issued Jun. 7, 2005 and entitled "PFC-PWM Controller Having Interleaved Switching", discloses another cascade of PFC and PWM converters, with interleaved switching and an oscillator determining the switching frequency of both converters. In this arrangement, the switching frequency is decreased under light-load and zero-load conditions, so that power consumption of the power converter is reduced under such conditions.

Apart from these light-load and zero-load conditions to reduce power consumption, the cascaded PFC-PWM converter arrangements discussed above operate at a fixed switching frequency applicable to both of the cascaded converters. Although Hwang U.S. Pat. No. 5,565,761 recites at column 3, lines 37-40 with respect to PWM that "By changing the frequency at which the switches are opened and closed, as the input voltage changes, the output voltage VOUT can be maintained at a constant level as desired.", it is apparent to a person of ordinary skill in the art that this is an error, and that it is the duty cycle that is changed to this end, not the frequency.

Typically, a lower power PFC converter is operated in critical conduction mode, also referred to as transition mode, in which the primary switch of the converter is turned on just at the time that the inductor current has fallen to zero. In this case the switching frequency is variable because it is determined by the operating conditions of the converter rather than by an oscillator. This is a discontinuous conduction mode (DCM) in which the inductor current falls to zero.

Another operating mode, referred to as fixed off-time (FOT) control and known from STMicroelectronics Application Note AN1792, "Design Of Fixed-Off-Time-Controlled PFC Pre-Regulators With The L6562", November 2003, uses a switching waveform with a fixed off-time and hence a variable frequency, without an oscillator. In this mode DCM and CCM operation occur alternately at different phases during a cycle of an input rectified AC line voltage. This mode requires the switching frequency to be very limited to keep distortion within acceptable limits, unless the off-time is made a function of the instantaneous line voltage, with more complexity and less predictable results.

It is desirable for the converter switching frequency to be relatively high, in order to reduce the sizes of reactive components. However, switching losses increase with increasing switching frequency, resulting in practical upper limits to the switching frequencies that can be used.

It is also known to reduce power converter switching losses by using a resonant mode power converter, taking advantage of zero voltage switching (ZVS) and/or zero current switching (ZCS). Examples of resonant mode converters include series resonant, parallel resonant, series parallel resonant or LCC, and LLC converters examples of which using a half bridge converter topology are described in Chapter 4, entitled "LLC Resonant Converter", of "Topology Investigation for Front End DC/DC Power Conversion for Distributed Power System", by Bo Yang in a dissertation submitted to the Faculty of the Virginia Polytechnic Institute and State University, Sep. 12, 2003. Among such resonant mode converters, an LLC converter is preferred for reasons explained in the dissertation.

An LLC power converter is also known for example from Blom et al. U.S. Pat. No. 6,437,994, issued Aug. 20, 2002 and entitled "LLC Converter Includes A Current Variation Detector For Correcting A Frequency Adjusting Control Signal Of An Included Difference Detector".

An LLC converter has two resonant frequencies, namely a series resonant frequency and a parallel resonant frequency, and is typically designed to operate in a range between these resonant frequencies in which the gain of the circuit is negative, meaning that an increase in frequency decreases the energy transferred to the output of the converter. For example with a half bridge topology, the half bridge current lags the half bridge voltage due to a primarily inductive nature of the resonant tank in this range, so that the LLC can be operated to advantage with ZVS.

An LLC converter is thus operated with a variable frequency switching waveform, which is a substantially square waveform with dead times to avoid simultaneous conduction of the half bridge switches. A higher frequency corresponds to a lighter load, which is the converse of the PFC-PWM converter arrangement of Ta-yung Yang referred to above. Although a particular LLC converter may be designed for operation over a relatively narrow range of frequencies, different LLC converters for use in different applications, and with potentially different input voltages, may be required to operate in very different frequency ranges over a wide frequency band.

STMicroelectronics Application Notes AN2321, "Reference design: high performance, L6599-based HB-LLC adapter with PFC for laptop computers", August 2006 and AN2393, "Reference design: wide range 200 W L6599-based HB LLC resonant converter for LCD TV & flat panels", September 2006 disclose cascaded PFC and half bridge LLC power converters each using an L6563 controller for the PFC converter (in transition mode in AN2321, using FOT control in AN2393) and a separate L6599 resonant controller for the LLC converter. Reference is also directed in these respects to STMicroelectronics data sheets L6563, "Advanced transition-mode PFC controller", November 2006 and L6599, "High-voltage resonant controller", July 2006.

In these arrangements, the switching frequency of the PFC converter is necessarily completely independent of the switching frequency of the LLC converter, each frequency being determined in accordance with the operating characteristics of the respective power converter.

Accordingly, in such arrangements switching edges of the two cascaded power converters occur independently of one another, and hence sometimes simultaneously in a relatively arbitrary and unpredictable manner, depending on operating conditions (e.g. supply and load voltages and currents) of the converters. Noise and electro-magnetic interference (EMI) may be increased, and in any event become unpredictable, as a result. In particular, these arrangements have two switching frequencies, one for each converter, and correspondingly two harmonic spectra which may contribute to EMI with unknown interactions.

There is a need to provide an improved arrangement of cascaded power converters and improved control arrangements therefor.

SUMMARY OF THE INVENTION

One aspect of this invention provides a method of controlling a resonant mode converter and a PFC (Power Factor Correction) converter having an output coupled to an input of the resonant mode converter, comprising the steps of: controlling a switching frequency of the resonant mode converter in dependence upon an output of the resonant mode converter thereby to control the output of the resonant mode converter, the output of the resonant mode converter changing with changing switching frequency; and controlling the PFC converter with a signal having a switching frequency that is harmonically related to the switching frequency of the resonant mode converter.

In a preferred embodiment of the method, in which the resonant mode converter can advantageously be an LLC converter, the step of controlling the switching frequency of the resonant mode converter decreases the output of the resonant mode converter with increasing switching frequency.

Preferably the step of controlling the PFC converter comprises controlling the PFC converter with a PWM (pulse width modulated) signal having a frequency that is the same as or is an integer fraction (e.g. ½, ⅓, etc.) of the switching frequency of the resonant mode converter. This avoids the PFC switching frequency being higher than the resonant mode converter frequency, which is undesirable in view of relatively high switching losses of the PFC converter at high switching frequencies. However, it complicates the control arrangement for the converters.

More particularly, it is convenient to determine the switching frequency of a resonant mode converter, such as an LLC converter, by alternately charging a capacitor with a constant current dependent upon a control signal to produce a linear ramp, and rapidly discharging the capacitor at the end of the ramp, thereby producing a sawtooth waveform, and deriving from this a square waveform, with equal on and off times as is required, to drive switches of the LLC converter at half the sawtooth frequency. Using the sawtooth waveform for PWM control of the PFC converter would result in the PFC converter switching frequency being twice the LLC converter switching frequency, which is not desirable. Deriving from the LLC converter sawtooth signal another ramp or sawtooth signal at a lower frequency for the PFC converter is difficult in terms of accuracy of the ramp and its maximum amplitude, in avoiding ringing and other undesirable anomalies at the ramp edges, and in requiring a wideband amplifier to handle the signal slew rate required. For providing a control arrangement in an integrated circuit (IC) as is typically desired, these difficulties become very significant.

These difficulties are reduced or avoided in an embodiment of the invention as described below.

In this respect the step of controlling a switching frequency of the resonant mode converter can comprise producing a sawtooth waveform with a linear ramp at twice the switching frequency of the resonant mode converter, and the step of controlling the PFC converter can comprise defining two thresholds for comparison with the linear ramp for control of switching times of the PFC converter in different cycles of the sawtooth waveform, so that a switch of the PFC converter is turned on during one cycle of the sawtooth waveform using one threshold and is turned off during a subsequent cycle of the sawtooth waveform using the other threshold.

Thus in one example in which the PFC converter is controlled with a switching frequency of which is half the sawtooth waveform frequency, and hence equal to the LLC converter switching frequency, a switch of the PFC converter is turned on during one cycle of the sawtooth waveform using one threshold and is turned off during the next cycle of the sawtooth waveform using the other threshold. Similar principles can be applied when the PFC converter switching frequency is a sub-harmonic, e.g. half, of the LLC converter switching frequency.

Preferably a sum of the two thresholds is equal to a height, or maximum amplitude, of the linear ramp. Thus the two thresholds are complementary to one another with respect to the amplitude of the sawtooth waveform.

Preferably the method includes the step of avoiding transitions of the signal controlling the PFC converter simultaneously with switching transitions of the resonant mode converter. To this end, a duty cycle range of the PFC converter can be restricted by keep-out zones in the regions of 0% and 100% duty cycle times, corresponding to the falling edges of the sawtooth waveform at which switch transitions of the LLC converter occur.

In a particular embodiment of the method, the step of controlling the PFC converter comprises controlling the PFC converter with a PWM (pulse width modulated) signal having a frequency that is the same as the switching frequency of the resonant mode converter and a phase such that the resonant mode converter is drawing current from the PFC converter when a primary switch of the PFC converter is turned off, in order to minimize ripple voltage.

Another aspect of the invention provides a control arrangement for a PFC (Power Factor Correction) power converter and a resonant mode converter, the control arrangement comprising: a first control unit responsive to a signal dependent upon an output of the resonant mode converter for providing complementary control signals for controlling switches of the resonant mode converter at a controlled switching frequency thereby to control said output; and a second control unit for providing at least one PFC control signal for controlling a switch of the PFC converter at a switching frequency that is harmonically related to said controlled switching frequency.

Preferably the second control unit includes a circuit for producing the PFC control signal as a PWM (pulse width modulated) signal having a frequency that is the same as or is an integer fraction of said controlled switching frequency.

Said circuit is preferably responsive to a signal representing the controlled switching frequency of the resonant mode converter for producing the PWM signal so that transitions of the PFC control signal do not occur simultaneously with switching transitions of the resonant mode converter.

In an embodiment of the invention, said circuit comprises two comparators each for comparing a respective one of two thresholds with a linear ramp of a sawtooth waveform at twice said controlled switching frequency, and logic functions responsive to outputs of the comparators for producing the PWM signal with respective transitions to turn on and off the switch of the PFC converter in different cycles of the sawtooth waveform. Preferably a sum of the two thresholds is equal to a height, or maximum amplitude, of the linear ramp.

The invention also provides a cascaded power converter arrangement comprising a PFC converter and a resonant mode converter, an output of the PFC converter being coupled to an input of the resonant mode converter, and a control arrangement as recited above arranged to control the converters. Preferably the resonant mode converter comprises an LLC converter.

BRIEF DESCRIPTION OF THE DRAWINGS

The invention and aspects thereof will be further understood from the following description by way of example with reference to the accompanying drawings, in which.

DETAILED DESCRIPTION

Figure 1:
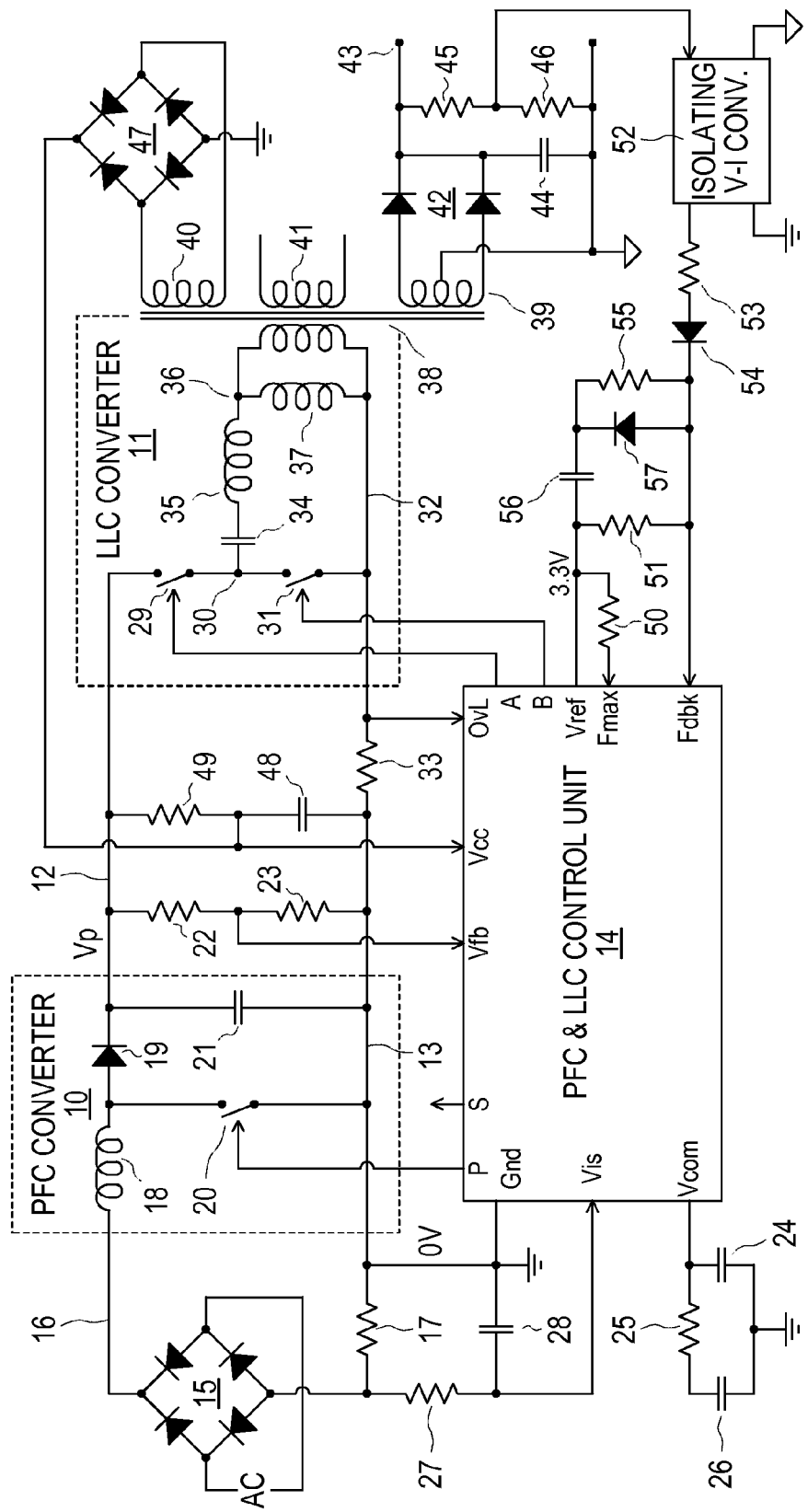
FIG. 1 schematically illustrates a power supply arrangement, including cascaded PFC and LLC power converters and a control arrangement for the converters, in accordance with an embodiment of the invention.

A power supply arrangement as illustrated in FIG. 1 includes a PFC power converter 10 and an LLC power converter 11, the converters being shown within broken line boxes. The converters 10 and 11 are cascaded, a positive output voltage Vp of the PFC converter 10, produced on a line 12 relative to a zero-volt (0V) line 13 connected to ground as shown, being connected as an input voltage for the LLC converter 11. The cascaded PFC and LLC power converters 10 and 11 are controlled as described further below by a PFC and LLC control unit 14, which has a ground connection Gnd connected to the line 13.

AC power supplied to an input of the power supply arrangement is rectified by a diode bridge 15. A positive rectified AC output of the diode bridge 15 is coupled via a line 16 to a positive voltage input of the PFC converter 10, and a return path is provided from the 0V line 13 to the diode bridge 15 via a current sensing resistor 17. By way of example, the line 16 may have a peak voltage in a range of about 125V to about 360V, depending on a voltage of the AC power, and the voltage Vp on the line 12 may be about 385V.

The PFC converter 10 shown in FIG. 1 comprises a conventional boost converter including an input inductor 18 and a diode 19 coupled in series between the line 16 and the line 12, a controlled switch 20, typically constituted by a MOSFET, coupled between a junction of the inductor 18 with the diode 19 and the 0V line 13, and an output capacitor 21 coupled between the lines 12 and 13. The switch 20 is controlled to be opened and closed by an output P of the control unit 14. Another output S of the control unit 14, not connected in FIG. 1, is provided for complementary control (with dead times) of a secondary switch (not shown) which may be provided in other forms of PFC converter.

A voltage divider comprising resistors 22 and 23 connected in series between the lines 12 and 13 supplies to a voltage feedback input Vfb of the control unit 14 a voltage proportional to the output voltage Vp of the PFC converter 10. Within the control unit 14, this voltage is supplied to a transconductance amplifier having an output coupled to a compensation point Vcom of the control unit 14, from which a capacitor 24, and a resistor 25 in series with a capacitor 26, are connected to ground or 0V. A negative voltage (relative to ground or 0V), produced at the junction of the current sensing resistor 17 with the diode bridge 15 and proportional to input current of the PFC converter 10, is coupled to another input Vis of the control unit 14 via a low pass filter constituted by a series resistor 27 and a shunt capacitor 28.

It is noted that the control unit 14 does not monitor the input voltage of the PFC converter 10, but only the input current and the output voltage Vp. The control unit 14 controls an off-time duty cycle Doff of the PFC converter switch 20 in accordance with:

$$Doff = Vi/Vp = Re*Is/Vp$$

where Vi is the input voltage on the line 16, Is is the input current sensed by the current sensing resistor 17, and Re is the equivalent load of the PFC converter reflected to its input, over a wide frequency range to provide a near-unity power factor for the power supply arrangement.

The LLC converter 11 has a half bridge topology comprising a primary switch 29 between the converter input voltage line 12 and a junction point 30, and a secondary switch 31 between the junction point 30 and a line 32 of the converter. The switches 29 and 31, which typically comprise MOSFETs, are controlled in a complementary manner, with dead times so that they are not simultaneously conductive, by outputs A and B respectively of the control unit 14. The line 32 is coupled to the 0V line 13 via a current sensing resistor 33 providing a return path of the LLC converter 11, and is connected to an input OvL of the control unit 14 to which it supplies a voltage proportional to input current of the LLC converter 11.

The junction point 30 is coupled to an output junction 36 of the LLC converter 11 via a capacitor 34 and a series inductor 35, the junction 36 being coupled via another inductor 37 to the line 32. The inductors 35 and 37, and the capacitor 34, constitute the LLC components of the converter 11. Outputs of the LLC converter 11 are taken from secondary windings of a transformer 38, which has a primary winding connected between the junction 36 and the line 32. In FIG. 1 the transformer 38 is represented as an "ideal" transformer, separate from the inductors 35 and 37. In practice, part or all of the inductances of the inductors 35 and 37 can be constituted by leakage and magnetizing inductances of the transformer 38, so that functions of these inductors and the transformer are combined.

The transformer 38 can have any desired number of secondary windings; three secondary windings 39, 40, and 41 are shown by way of example in FIG. 1. The winding 39 has a centre tap, connected to a secondary side ground, and ends connected via full wave rectifier diodes 42 to an output 43. A smoothing capacitor 44 is connected between the output 43 and the secondary side ground, so that the output 43 provides a DC voltage output for equipment (not shown) powered by the power supply arrangement. A voltage divider, comprising resistors 45 and 46 connected in series between the output 43 and the secondary side ground, provides a voltage feedback for the LLC converter 11 as is further described below.

The secondary winding 40 is coupled to a diode bridge 47 whose negative output is connected to the primary side ground or 0V and whose positive output, smoothed by a capacitor 48 connected between this positive output and the 0V line 13, provides a supply voltage to an input Vcc of the control unit 14 for powering the control unit in a bootstrapped manner. To this end, a high impedance resistor 49 is also connected between the output line 12 of the PFC converter 10 and the input Vcc.

On connection of AC power to the power supply arrangement of FIG. 1, a small current flows via the inductor 18, diode 19, and resistor 49 to charge the capacitor 48, and the supply voltage at the input Vcc of the control unit 14 rises. On this reaching a start-up voltage of, for example, about 13V, this is detected by the control unit 14 which accordingly starts to drive the LLC converter 11, thereby to produce an output voltage via the secondary winding 40 and the diode bridge 47 to maintain charge of the capacitor 48 to a desired operating voltage of the control unit 14, for example about 12V. The initial operation of the control unit 14 reduces the charge of the capacitor 48, but not sufficiently to fall below a shut-down threshold voltage, of for example about 8.5V.

The secondary winding 41, to which no connections are shown in FIG. 1, is representative of any number of other secondary windings of the transformer 38 which may be used to provide other desired AC and/or DC outputs at high or low voltages, as may be desired. It can be appreciated that functions of the secondary windings can be combined, so that the transformer 38 can have one or more secondary windings.

The supply voltage at the input Vcc of the control unit 14 can be used by the control unit 14 to provide a sufficiently high voltage to drive the switches 20, 29, and 31 of the converters 10 and 11. In addition, the control unit 14 uses this supply voltage to produce at an output Vref a regulated supply voltage; this supply voltage is also used within the control unit 14 for powering most of its circuits. In addition, using the unregulated and/or regulated supply voltages the control unit 14 powers a bandgap voltage reference (not shown) and derives various threshold voltages for use in operation of the control unit. By way of example, the regulated supply voltage is assumed to be 3.3V as shown in FIG. 1, and other voltages and voltage ranges referred to below are given in the context of this supply voltage.

A resistor 50 is connected between the output Vref of the control unit 14 and an input Fmax of the control unit, to which it supplies a current which determines a desired maximum switching frequency of the LLC converter 11. Another resistor 51 is connected between the output Vref of the control unit 14 and an input Fdbk of the control unit, to which it supplies a current which determines a desired minimum switching frequency of the LLC converter 11. An electrically isolating voltage-to-current (V-I) converter 52 produces at its output an error current which is supplied via a series resistor 53 and a diode 54 to the input Fdbk of the control unit 14 for feedback control of the frequency of the LLC converter 11 within the range determined by the resistors 50 and 51. This feedback error current is proportional to a difference between the voltage at the junction between the resistors 45 and 46, supplied to the converter 52 and representing the voltage at the DC output 43, and a reference voltage (not shown), and can be produced in a frequency compensated manner for example along the lines shown in FIG. 1 of Application Note AN2321 referred to above.

An additional circuit, comprising a resistor 55 in series with a capacitor 56 between the input Fdbk and the output Vref of the control unit 14, and optionally with a diode 57 in parallel with the resistor 55 as shown in FIG. 1, provides for a soft start of the LLC converter 11 under no-load or light load conditions, whereby the switching frequency is reduced gradually from its maximum to a normal operating value.

Figure 2:
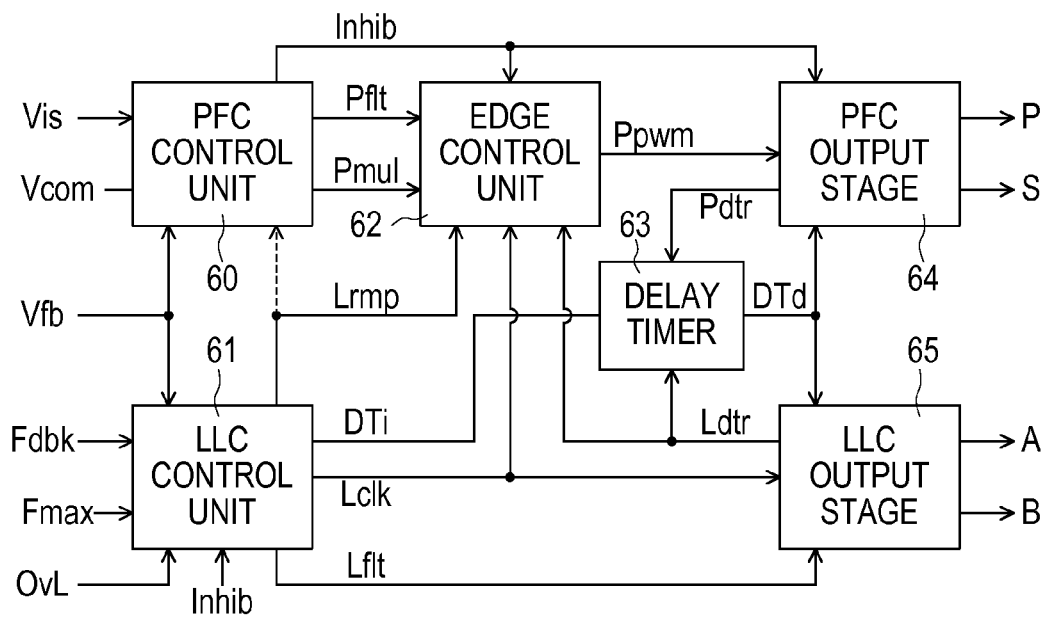
FIG. 2 illustrates in a block diagram parts of one form of a PFC and LLC control unit of the control arrangement of FIG. 1.

FIG. 2 shows a block diagram of parts of one form of the PFC and LLC control unit 14 of the power supply control arrangement of FIG. 1. These parts comprise a PFC control unit 60, an LLC control unit 61, an edge control unit 62, a delay timer 63, a PFC output stage 64, and an LLC output stage 65. For simplicity other parts of the control unit 14, such as for voltage regulation, producing desired threshold voltages, programming desired settings, and test purposes, are not shown.

Except for the connections Gnd, Vcc, and Vref which are not shown in FIG. 2, FIG. 2 shows the same external connections of the control unit 14, using the same references, as FIG. 1. These references are also used to refer to signals at the respective connections. FIG. 2 also shows various signals that are produced within and exchanged among various parts of the control unit in operation, as described further below. Functions of the blocks shown in FIG. 2 and the related signals are briefly described as follows.

The PFC control unit 60 is supplied with the PFC current sensing voltage Vis and the PFC feedback voltage Vfb, and also has a connection to the compensation point Vcom to which the components 24 to 26 are connected as described above. These components are selected for a voltage at the point Vcom of typically 0.5 to 2.5V with a PFC control loop bandwidth of the order of about 10 to 20 Hz. The PFC control unit 60 compares the feedback values Vis and Vfb with over-current and over-voltage threshold values respectively, and in response to an over-current or over-voltage condition of the PFC converter 10 determined by these comparisons it produces a PFC fault signal Pflt which is supplied to the edge control unit 62. The PFC control unit 60 also compares the feedback voltage Vfb with an inhibit threshold voltage, and in response to an under-voltage condition (e.g. in the event of AC brown-out or failure) determined by this comparison produces an inhibit signal Inhib which is supplied to the LLC control unit 61, the edge control unit 62, and the PFC output stage 64.

In normal operating conditions, the PFC control unit 60 processes the feedback signals Vis and Vfb to produce a signal Pmul, which is supplied to the edge control unit 62, which is directly proportional to the off-time duty cycle Doff required for the PFC converter 10 at any instant to provide the desired power factor correction in accordance with the above equation for Doff. Thus throughout each rectified AC cycle of the PFC input voltage on the line 16 in FIG. 1, the off-time duty cycle Doff, as represented by the signal Pmul, is varied by the PFC control unit 60 to present an equivalent substantially resistive load to the AC supply. By way of example, the signal Pmul can have a value from 0 to 2.0V for representing off-time duty cycles from 0 to 100%.

The PFC control unit 60 can optionally use a ramp signal Lrmp, which is produced by the LLC control unit 61 as described below, which can be supplied to the PFC control unit 60 as shown by a dashed line in FIG. 2.

The LLC control unit 61 is supplied with the signal Fdbk, which as described above is a current representing an error voltage of the LLC converter, and uses this to produce a controlled frequency square waveform clock signal Lclk which is supplied to the LLC output stage 65, and also to the edge control unit 62. The LLC control unit 61 also produces a sawtooth or ramp signal Lrmp which is supplied to the edge control unit 62 and, optionally as described above, to the PFC control unit 60. For example the ramp signal Lrmp has an amplitude from 0 to 2.0V and a frequency which is twice the frequency of the clock signal Lclk. As indicated above, a minimum frequency of the LLC clock signal Lclk is set by a minimum current supplied to the input Fdbk via the resistor 51, and a maximum frequency of the LLC clock signal Lclk is set by the resistor 50 supplying a current via the input Fmax to a current mirror arrangement in the LLC control unit 61. For example the maximum frequency may be set to a value about 2 or 3 times a normal LLC operating frequency for a particular application, with the minimum frequency being lower than this normal operating frequency. The normal operating frequency typically is in a narrow frequency range, but may be selected from a wide frequency band, for example of the order of about 50 kHz to about 1 MHz, for any particular application of the LLC converter.

The LLC control unit 61 also produces a signal DTi for the delay timer 63, this signal being a current that is produced by the current mirror arrangement in the LLC control unit 61 in dependence upon the current supplied to its input Fmax. The delay timer 63 determines a dead time in dependence upon the current signal DTi, so that the dead time is adjusted for the wide range of possible LLC frequencies.

In addition, the LLC control unit 61 is supplied with the inhibit signal Inhib to inhibit generation of the signals Lrmp and Lclk when the signal Inhib is asserted. The LLC control unit 61 is further supplied via the input OvL with the voltage dropped across the resistor 33 and representing input current of the LLC converter 11, and compares this with at least one threshold to determine a possible overload condition of the LLC converter, in response to which it produces an LLC fault signal Lflt which is supplied to the LLC output stage 65. The LLC control unit 61 is also supplied with the PFC feedback voltage signal Vfb, which it compares with a threshold to enable start-up of the LLC converter only when the PFC converter output voltage Vp is above a selected level, for example 360V. A soft start function in the LLC control unit 61 operates in conjunction with the components 55 to 57 in FIG. 1 as indicated above to provide a soft start when the LLC converter is enabled and after any overload fault.

The edge control unit 62 compares the duty cycle signal Pmul with the LLC ramp signal Lrmp to produce a PFC PWM signal Ppwm with the desired duty cycle, this signal being supplied to the PFC output stage 64. The signal Ppwm is harmonically related to the LLC clock signal Lclk, which is also supplied to the edge control unit 62, conveniently in a 1:1 or same-frequency relationship. The edge control unit 62 produces the signal Ppwm with edges or transitions that are timed to avoid coinciding with edges of the signal Lclk, for minimum interference, and with a phase for maximum efficiency of the power supply arrangement. To this end the edge control unit 62 is also supplied with a signal Ldtr produced by the LLC output stage 65 as described below, and which is high during dead times of the LLC output stage. The edge control unit 62 is further supplied with the signals Pflt and Inhib, in response to either of which it inhibits the signal Ppwm.

The delay timer 63 is responsive to a PFC delay time request signal Pdtr supplied to it from the PFC output stage 64, or an LLC delay time request signal Ldtr supplied to it from the LLC output stage 65, to produce a delay time done signal DTd, which is supplied to each of these output stages 64 and 65, after a delay time that is determined as indicated above by the signal DTi, whereby the delay time is adjusted to suit the normal operating frequency of the LLC converter 11 (and the switching frequency of the PFC converter 10 which is here assumed to be the same).

The PFC output stage 64 comprise a level shifter and gate driver for producing the output P for driving the primary switch 20 of the PFC converter 10 in accordance with the signal Ppwm and unless it is inhibited by the signal Inhib, with a similar arrangement for driving the output S in a complementary manner, with dead times, to avoid undesired simultaneous conduction of PFC converter switches, provided by the delay timer 63 as described above. The PFC output stage 64 can include more complex arrangements for producing various relative timings of its output signals P and S to suit different switching arrangements that may be required for different types of PFC converter.

The LLC output stage 65 also comprises level shifters and gate drivers for producing its output signals A and B for driving the switches 29 and 31 respectively of the LLC converter 11, unless these are inhibited by the signal Lflt, at the frequency of the signal Lclk and with dead times, to avoid simultaneous conduction of the switches 29 and 31, provided by the delay timer 63 as described above.

Particular forms of the PFC control unit 60 and the LLC control unit 61 are described in greater detail and by way of example in the related applications referred to above. Particular forms of other parts of the PFC and LLC control unit 14 are described in greater detail and by way of example below.

Figure 3:
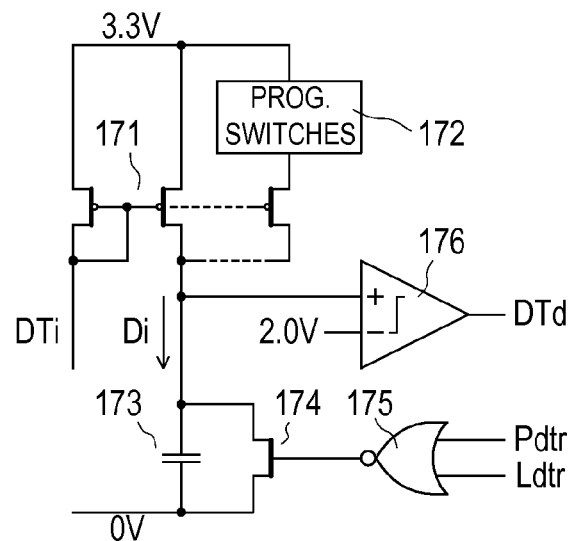
FIG. 3 schematically illustrates one form of a delay timer of the control unit of FIG. 2.

FIG. 3 shows a particular form of the delay timer 63, in which the current DTi is mirrored by a current mirror 171, constituted by P-channel transistors with multiple outputs selectively connected in parallel by programmable switches 172, to produce a calibrated current Di for charging a capacitor 173. The switches 172 are programmed to compensate for manufacturing process variations, in particular for the capacitor 173.

An N-channel transistor 174 has its drain-source path in parallel with the capacitor 173 and its gate connected to the output of a NOR gate 175 whose inputs are supplied with the signals Pdtr and Ldtr, so that a voltage across the capacitor 173 is held at zero until one of the signals Pdtr and Ldtr goes high at the start of a requested dead time. Then the capacitor 173 is charged, with its voltage, supplied to a non-inverting input of a comparator 176 to an inverting input of which is supplied a threshold voltage of 2.0V as shown, rising linearly until it reaches the threshold at the end of the dead time, the comparator state then changing to produce a high value at its output constituting the signal DTd. In response to the high value of the signal DTd, a high value of the signal Ldtr is ended in the LLC output stage 65 for example as described below; a high value of the signal Pdtr is similarly ended in the PFC output stage 64. It is observed that the signals Pdtr and Ldtr can not both be high simultaneously.

Figure 4:
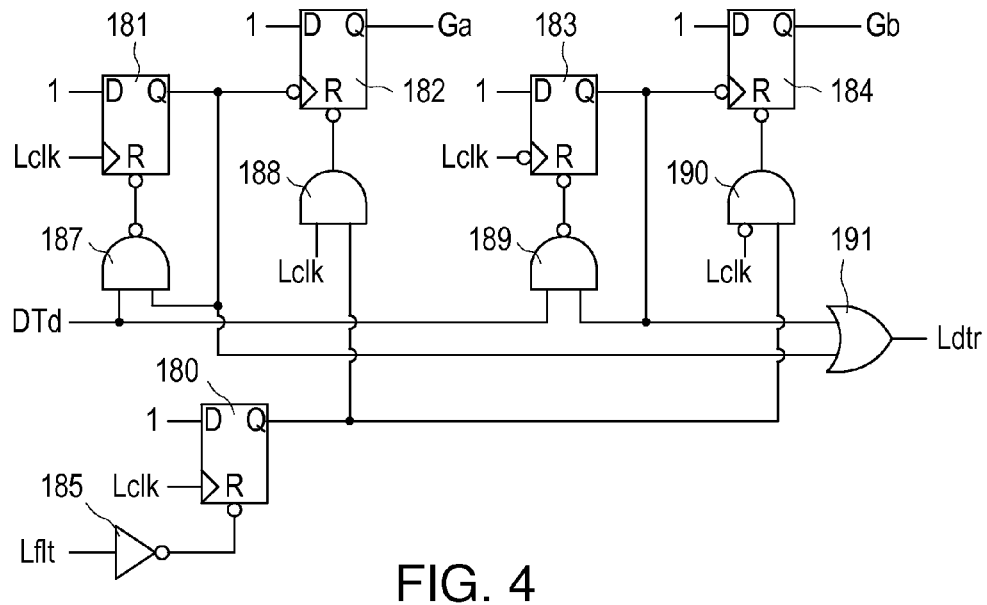
FIG. 4 illustrates parts of one form of an LLC output stage of the control unit of FIG. 2.

FIG. 4 illustrates parts of the LLC output stage 65 for producing the signal Ldtr and signals Ga and Gb, the latter signals being level shifted and buffered in subsequent parts of the LLC output stage 65 to produce the gate drive signals A and B respectively. The circuit in FIG. 4 comprises flip-flops 180 to 184 each having a data input D supplied with a logic 1 or high level, a clock input shown in a conventional manner, a reset input R, and an output Q; an inverter 185; and gates 187 to 191.

The signal Lflt is inverted by the inverter 185 for asynchronously resetting the flip-flop 180 in the event of a fault, thereby asynchronously making the signals Ga and Gb zero via the Q output of the flip-flop 180, gates 188 and 190, and reset inputs of the flip-flops 182 and 184. The flip-flop 180 is set synchronously, in the absence of the fault signal Lflt, by the LLC clock signal Lclk.

A rising edge of the signal Lclk sets the flip-flop 181 so that it produces a logic 1 output, producing a high level of the signal Ldtr via the OR gate 191 and enabling the gate 187. In response to the delay timer 63 producing a high level of the signal DTd after a dead time delay as described above, the flip-flop 181 is reset via the gate 187, thereby ending the high level of the signal Ldtr and setting the flip-flop 182 which consequently produces a high level of its output signal Ga. With the next (falling) edge of the signal Lclk the flip-flop 182 is reset via the gate 188 to end the high level of the output Ga, and the flip-flop 183 is set to produce another high level of the signal Ldtr via the gate 191. The signal Gb is produced in a similar but complementary manner, with the signal DTd at the end of another dead time resetting the flip-flop 183 via the gate 189, thereby ending the high level of the signal Ldtr and setting the flip-flop 184, which produces a high level of the signal Gb until the next (rising) edge of the LLC clock signal Lclk. The signals Ga and Gb have identical high level periods, as is desired for operation of the LLC converter 11, because they are derived from the square waveform clock signal Lclk using the same delay timer 63 for the dead times.

Figure 5:
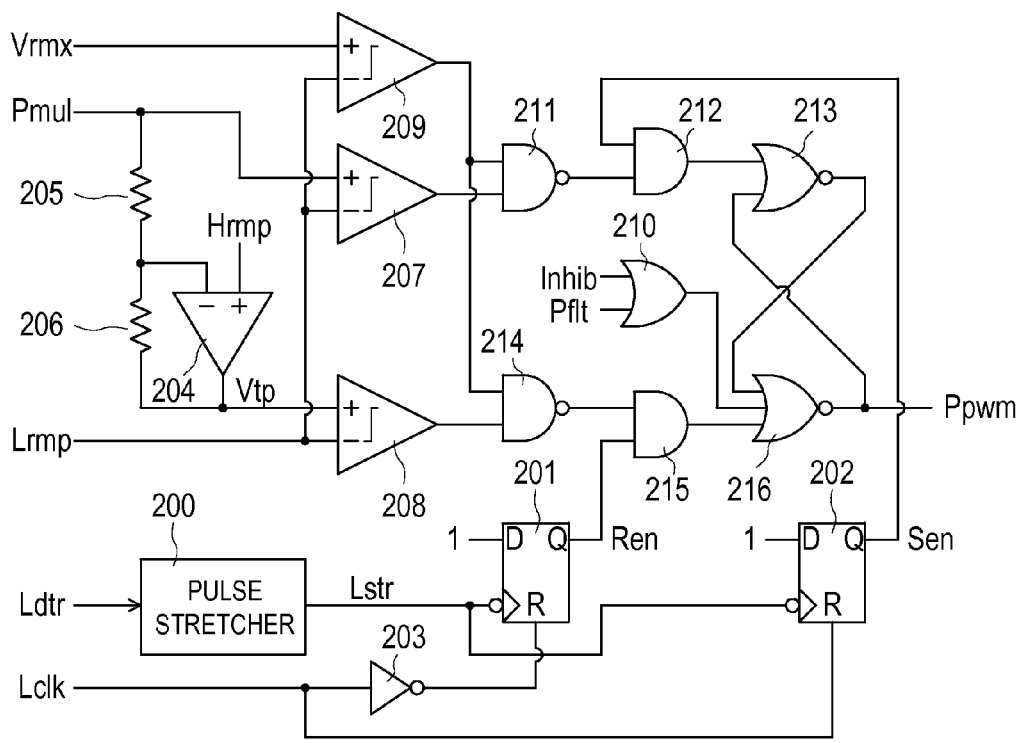
FIG. 5 illustrates one form of an edge control unit of the control unit of FIG. 2.

FIG. 5 illustrates a particular form of the edge control unit 62, which comprises a pulse stretcher 200; flip-flops 201 and 202 each having a data input D supplied with a logic 1 or high level, a clock input shown in a conventional manner, a reset input R, and an output Q; an inverter 203; a circuit comprising a differential amplifier 204 and resistors 205 and 206; comparators 207 to 209; and gates 210 to 216.

The NOR gates 213 and 216 are cross-coupled to form an output latch producing the signal Ppwm at the output of the gate 216. The OR gate 210 resets this latch, to make the signal Ppwm a logic 0 or low level, in response to either of the signals Inhib and Pflt having a high level. The AND gate 212, which is enabled by a high level of a set enable signal Sen at the output of the flip-flop 202, provides a signal for setting the output latch, and the AND gate 215, which is enabled by a high level of a reset enable signal Ren at the output of the flip-flop 201, provides a signal for resetting the output latch. The flip-flops 201 and 202 are clocked by falling edges of a signal Lstr at the output of the pulse stretcher 200; these falling edges are delayed in relation to falling edges of the signal Ldtr for example by a delay of the order of 30 ns. The flip-flop 202 is reset by a high level of the LLC clock signal Lclk, and the flip-flop 201 is reset via the inverter 203 by a low level of the signal Lclk.

The LLC ramp signal Lrmp is supplied to an inverting input of each of the comparators 207 to 209. The signal Pmul from the PFC control unit 60, representing the off-time duty cycle Doff, is supplied to a non-inverting input of the comparator 207, and via the resistor 205 to an inverting input of the amplifier 204. An output of the amplifier 204, which is connected via the resistor 206 to the inverting input of the amplifier, and to a non-inverting input of the comparator 208, produces a voltage Vtp which represents the on-time duty cycle for the PFC converter 10, as further described below. A voltage Hrmp is supplied to a non-inverting input of the amplifier 204. A comparison voltage Vrmx, which is a little less than the 2.0V maximum voltage of the ramp signal Lrmp and a precise value of which can be selected by programming, is supplied to a non-inverting input of the comparator 209. Outputs of the comparators 207 and 209 are connected to inputs of the NAND gate 211, whose output is connected to an input of the AND gate 212, and outputs of the comparators 208 and 209 are connected to inputs of the NAND gate 214, whose output is connected to an input of the AND gate 215.

Conveniently, the voltage Hrmp is selected to be half the maximum voltage of the LLC ramp signal Lrmp, so that in this case with a ramp of 2.0V Hrmp is selected to be 1.0V, and the resistors 205 and 206 have equal resistance. As a result, the voltage Vtp=Vrmp-Pmul, where Vrmp is the maximum ramp voltage, and Vtp represents the on-time duty cycle of the PFC converter as indicated above, or 1-Doff.

Figure 6:
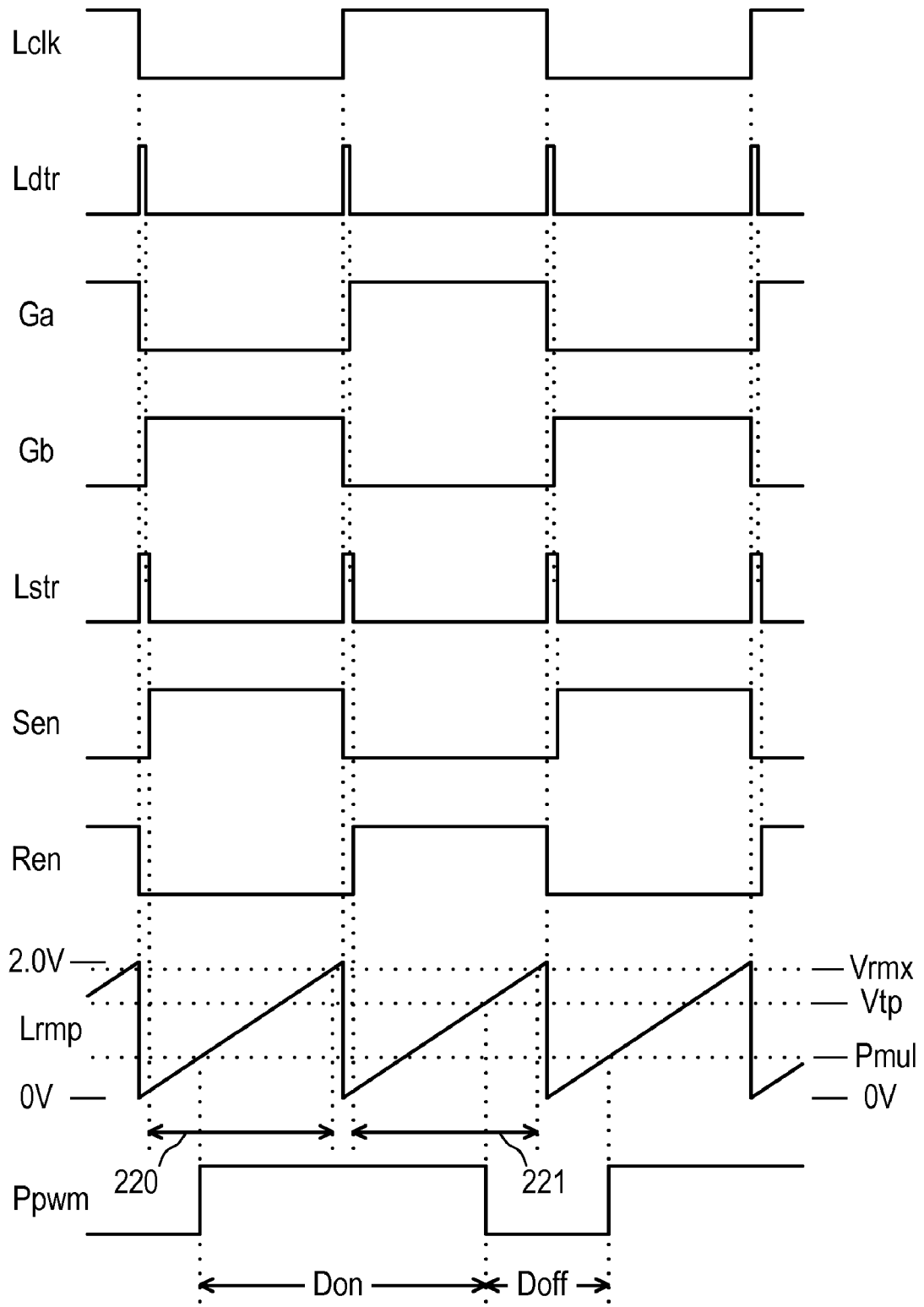
FIG. 6 shows diagrams and relative timing of signals that can occur in operation of the control unit of FIG. 2.

The operation of the edge control circuit will be further understood from the description below, which also makes reference to FIG. 6, showing (not to scale) diagrams and relative timing of signals that can occur in operation of the converter control arrangement. From top to bottom, FIG. 6 illustrates the signals Lclk, Ldtr, Ga, Gb, Lstr, Sen, Ren, Lrmp, and Ppwm.

As shown in FIG. 6, the signal Lclk has a square waveform (equal high and low durations) which is at a prevailing switching frequency of the converters 10 and 11. Narrow pulses of the signal Ldtr correspond to dead times of the LLC converter, during which the otherwise complementary signals Ga and Gb are both low, these signals being produced as described above with reference to FIG. 4. The signal Lstr has pulses coincident with the pulses of the signal Ldtr but with delayed falling edges due to the pulse stretcher 200, so that rising edges of the signals Sen and Ren occur after switching times of the signals Ga and Gb.

The LLC ramp signal Lrmp, shown for clarity in FIG. 6 with a larger vertical dimension than the other signals, has an amplitude which varies from 0V to 2.0V at twice the frequency of the signal Lclk. Horizontal broken lines intersecting the signal Lrmp indicate an example value of the signal Pmul, a consequent value of the voltage Vtp which as described above is equal to the maximum ramp voltage of 2.0V minus the voltage of the signal Pmul, and an example value of the threshold voltage Vrmx, which is a little less than the maximum ramp voltage of 2.0V and may be of the order of 1.9V or more.

As illustrated in FIG. 6, the signal Pmul represents a 30% off-time duty cycle and the voltage Vtp consequently represents a 70% on-time duty cycle. The signal Pmul can vary over substantially the full range of the ramp voltage from 0V to 2.0V, with consequent inverse variation of the voltage Vtp from 2.0V to 0V. Thus the voltage Vtp can be greater than, equal to, or less than the voltage of the signal Pmul.

The output latch (gates 213 and 216) of the edge control unit 62 is set, producing a rising edge of the output signal Ppwm, when the set enable signal Sen is high and the LLC ramp signal Lrmp rises above the signal voltage Pmul, or, if it is less, the voltage Vrmx. Consequently this rising edge occurs within a period shown in FIG. 6 by a double-headed arrow 220. The output latch is reset, producing a falling edge of the signal Ppwm, when the reset enable signal Ren is high and the LLC ramp signal Lrmp rises above the voltage Vtp, or, if it is less, the voltage Vrmx. Consequently this falling edge occurs within a period shown in FIG. 6 by a double-headed arrow 221. The periods shown by the arrows 220 and 221 exclude short periods, or keep-out zones, at and immediately before and after the switching times for the LLC converter 11 as shown by the signals Ga and Gb, so that switching times of the PFC converter 10 can not occur simultaneously with switching times of the LLC converter 11, regardless of the frequency of the LLC converter. The keep-out zones only slightly reduce the duty cycle range of the PFC converter 10.

As shown in FIG. 6, the signal Lrmp crosses the voltages Pmul and Vtp, producing transitions or edges of the signal Ppwm, at times that are equidistant from, or centered about, falling edges of the LLC ramp signal Lrmp. In accordance with the example values shown for the voltages Pmul and Vtp being 30% and 70% of the maximum ramp voltage of 2.0V, the on-time duty cycle of the signal Ppwm is 70% and the off-time duty cycle is 30% of the period of the signal Lclk as shown in FIG. 6.

As shown in FIG. 6, the set enable signal Sen is high during the period that the LLC clock signal Lclk is low and the primary switch 29 of the LLC converter 11, controlled by the signal Ga which is also low, is off. Consequently the on-time duty cycle Don of the PFC converter (primary) switch 20 is centered about a rising edge of the signal Lclk, immediately following which (after the dead time delay) the primary switch 29 of the LLC converter is turned on. Conversely, the off-time duty cycle Doff of the PFC converter (primary) switch 20 is centered about a falling edge of the signal Lclk and the turn-off time of the primary switch 29 of the LLC converter. This phase alignment of the signal Ppwm ensures that in each clock cycle the LLC converter 11 is drawing current from the output capacitor 21 of the PFC converter 10 when the PFC converter (primary) switch 20 is disabled or turned off, i.e. when the inductor 18 sources current into this capacitor 21. This reduces ripple voltage for the LLC converter 11. An opposite (180° different) phase relationship between the switching of the PFC and LLC converters 10 and 11 could alternatively be used, but is less advantageous because of relatively larger ripple of the PFC output voltage Vp.

Although as described above the voltage Vtp is produced and compared with the LLC ramp signal Lrmp, it will be appreciated that instead the voltage Pmul could be compared with a triangular waveform replacing the signal Lrmp and having positive and negative ramps during the opposite phases of the LLC clock signal Lclk. However, producing such a triangular waveform with sufficient accuracy in a CMOS IC presents difficulties.

In addition, although as described above the signal Ppwm is produced with the same frequency as the signal Lclk, so that the PFC converter 10 operates with the same switching frequency as the LLC converter 11, this need not be the case and any other desired harmonic relationship can be provided between the switching frequencies of the converters 10 and 11. For example, FIG. 7 illustrates signals illustrating operation of a control arrangement in which the PFC converter switching frequency is half the LLC converter frequency.

Figure 7:
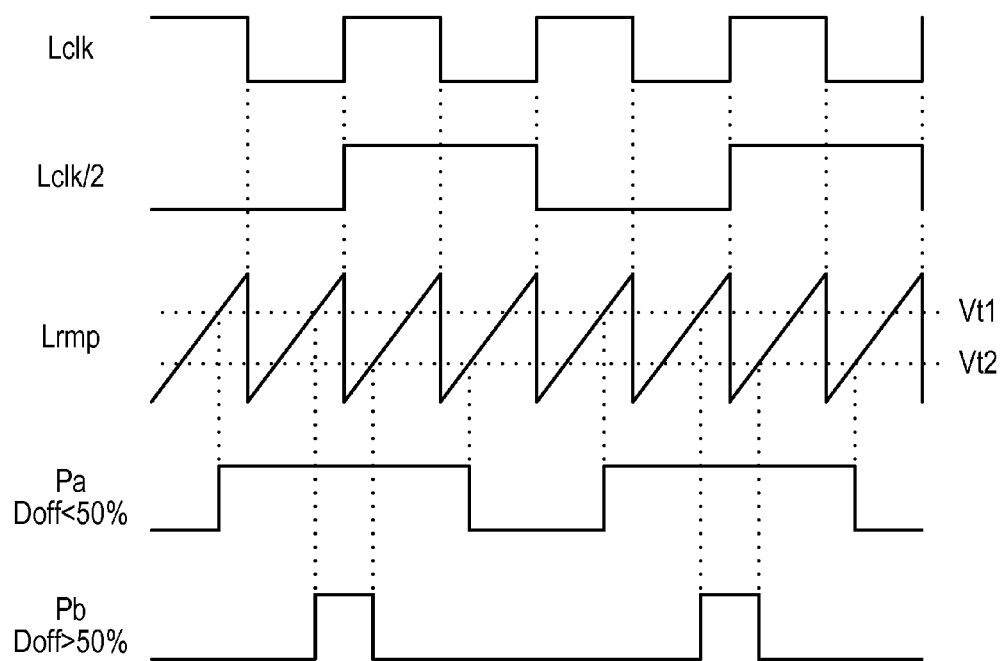
FIG. 7 shows diagrams and relative timing of signals that can occur in operation of a modified form of the control unit.

From top to bottom, FIG. 7 shows the LLC converter clock signal Lclk; a clock signal Lclk/2 at half the frequency, and with transitions on the rising edges, of the signal Lclk; the LLC ramp signal Lrmp having twice the frequency of the signal Lclk, with comparison threshold voltages Vt1 and Vt2; and signals Pa and Pb which represent a PWM signal for the PFC converter at half the frequency of the signal Lclk.

If the signal voltage Pmul is less than half the maximum amplitude of the ramp signal Lrmp, representing an off-time duty cycle less than 50%, then the threshold voltage Vt1 is set to twice the voltage Pmul, and the threshold voltage Vt2 is set to the maximum amplitude of the ramp minus the threshold voltage Vt1. In this case a rising edge of the PWM signal is produced when the ramp voltage Lrmp crosses the threshold voltage Vt1 while the clock signal Lclk is high and the half-frequency clock signal Lclk/2 is low, and a falling edge of the PWM signal is produced when the ramp voltage Lrmp crosses the threshold voltage Vt2 while the clock signal Lclk is low and the half-frequency clock signal Lclk/2 is high, to produce the PWM signal in the form of the signal Pa in FIG. 7. Thus for an off-time duty cycle less than 50%, rising and falling edges of the PWM signal occur during respectively first and fourth quarters of a cycle of the half-frequency clock signal Lclk/2, as shown by the signal Pa.

Conversely, if the signal voltage Pmul is greater than half the maximum amplitude of the ramp signal Lrmp, representing an off-time duty cycle more than 50%, then the threshold voltage Vt1 is set to twice the voltage Pmul minus the maximum amplitude of the ramp, and the threshold voltage Vt2 is again set to the maximum amplitude of the ramp minus the threshold voltage Vt1. In this case a rising edge of the PWM signal is produced when the ramp voltage Lrmp crosses the threshold voltage Vt1 while both of the signals Lclk and Lclk/2 are low, and a falling edge of the PWM signal is produced when the ramp voltage Lrmp crosses the threshold voltage Vt2 while both of the signals Lclk and Lclk/2 are high, to produce the PWM signal in the form of the signal Pb in FIG. 7. Thus for an off-time duty cycle greater than 50%, rising and falling edges of the PWM signal occur during respectively second and third quarters of a cycle of the half-frequency clock signal Lclk/2, as shown by the signal Pb.

With the signal timing of FIG. 7, keep-out zones can be provided at PWM duty cycles near to 0% and 100% in a similar manner to that described above. To prevent all simultaneous switching of the PFC converter switch(es) and the LLC converter switches, in this case a keep-out zone is also required near the 50% duty cycle point. This can be implemented in a similar manner.

It can be seen that similar principles can be applied to other fractional or harmonic relationships of the switching frequencies of the LLC and PFC power converters 10 and 11. In particular, this enables the PFC converter to be operated at a lower frequency than the LLC converter, to reduce losses.

Although the above description relates to an LLC converter using a half bridge topology, the invention can also be applied to other resonant mode converters and to other power converter topologies, for example to a full bridge topology in a similar manner. It can also be applied in a similar manner to controlling the switching of other power converters, not shown, which may be provided in addition to the PFC and LLC converters, for example to one or more flyback or other PWM converters that may be desired for providing additional supply voltages such as may be desired for standby and/or operating power for equipment powered by the power supply arrangement.

Although particular forms of the power supply arrangement and control units are described above by way of example, numerous modifications, variations, and adaptations may be made thereto without departing from the scope of the invention as defined in the claims.

What is claimed is:

1. A power supply, comprising:
   a PFC (power factor correction) converter including an input and an output, the PFC converter input coupled to an input of the power supply;
   a resonant mode converter including an input and an output, the resonant mode converter input coupled to the PFC converter output and the resonant mode output coupled to an output of the power supply; and
   a control unit coupled to receive a feedback signal representative of the output of the power supply, the control unit coupled to provide control signals coupled to control switches of the resonant mode converter at a controlled switching frequency to control the output of the power supply, the control unit further coupled to provide a PFC control signal coupled to control a switch of the PFC converter at a switching frequency that is harmonically related to the controlled switching frequency.

2. The power supply of claim 1 wherein the PFC control signal coupled to be provided by the control unit comprises a PWM (pulse width modulated) signal having a frequency that is the same as or is an integer fraction of the controlled switching frequency.

3. The power supply of claim 2 wherein the control unit is coupled to generate the PWM signal such that switching transitions of the PWM signal do not occur simultaneously with switching transitions of the resonant mode converter.

4. The power supply of claim 3 wherein the control unit comprises first and second comparators, wherein each of the first and second comparators is coupled to compare a respective one of two thresholds with a linear ramp of a sawtooth waveform at twice the controlled switching frequency.

5. The power supply of claim 4 wherein the control unit further comprises logic circuitry coupled to be responsive to outputs of the first and second comparators to produce the PWM signal with respective transitions to turn on and off the switch of the PFC converter in different cycles of the sawtooth waveform.

6. The power supply of claim 4 wherein a sum of the two thresholds is equal to a maximum amplitude of the linear ramp.

7. The power supply of claim 1 wherein the resonant mode converter comprises an LLC converter coupled between the input and the output of the resonant mode converter.

8. The power supply of claim 1 wherein the PFC converter comprises a boost converter coupled between the input and the output of the PFC converter.

* * * * *